US011947891B2

(12) United States Patent
Rao et al.

(10) Patent No.: US 11,947,891 B2
(45) Date of Patent: Apr. 2, 2024

(54) BALANCING CYCLE STEALING WITH EARLY MODE VIOLATIONS

(71) Applicant: International Business Machines Corporation, Armonk, NY (US)

(72) Inventors: Rahul M Rao, Bangalore (IN); Jayaprakash Udhayakumar, Bangalore (IN); Mithula Madiraju, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 17/407,510

(22) Filed: Aug. 20, 2021

(65) Prior Publication Data

US 2023/0057828 A1 Feb. 23, 2023

(51) Int. Cl.
*G06F 30/398* (2020.01)
*G06F 30/396* (2020.01)
*G06F 119/12* (2020.01)

(52) U.S. Cl.
CPC .......... *G06F 30/398* (2020.01); *G06F 30/396* (2020.01); *G06F 2119/12* (2020.01)

(58) Field of Classification Search
USPC ........................................................ 716/114
See application file for complete search history.

(56) References Cited

U.S. PATENT DOCUMENTS

| | | |
|---|---|---|
| 5,259,006 A | 11/1993 | Price et al. |
| 5,896,299 A | 4/1999 | Ginetti et al. |
| 6,550,044 B1 | 4/2003 | Pavisic et al. |
| 7,996,812 B2 | 8/2011 | Kotecha et al. |
| 9,070,433 B1 | 6/2015 | Bunc et al. |
| 9,280,630 B1 | 3/2016 | Lewis et al. |
| 9,519,746 B1 | 12/2016 | Madiraju et al. |
| 2001/0007144 A1* | 7/2001 | Terazawa .............. G06F 30/327 716/108 |
| 2004/0172571 A1 | 9/2004 | Sherlock |

(Continued)

FOREIGN PATENT DOCUMENTS

WO 2009/061093 A2 5/2009

OTHER PUBLICATIONS

International Search Report and Written Opinion, dated Oct. 25, 2022 issued in PCT International Application No. PCT/CN2022/108553.

*Primary Examiner* — Mohammed Alam
(74) *Attorney, Agent, or Firm* — Scully, Scott, Murphy & Presser, P.C.

(57) ABSTRACT

Methods and systems for circuit design are described. A tool may detect a timing violation on a signal path connected to a local clock buffer in a circuit model. The local clock buffer may be configured to generate a first clock signal having a first pulse width. The tool may determine a first metric associated with a first type of timing violation, and may determine a second metric associated with a second type of timing violation different from the first type of timing violation. The detected timing violation may be one of the first type and second type of timing violations. The tool may, based on the first metric and the second metric, determine whether to retain the generation of the first clock signal or to configure the local clock buffer to generate a second clock signal having a second pulse width different from the first pulse width.

20 Claims, 7 Drawing Sheets

(56) References Cited

U.S. PATENT DOCUMENTS

| | | | |
|---|---|---|---|
| 2004/0250185 A1* | 12/2004 | Date | G01R 31/318536 |
| | | | 714/726 |
| 2005/0010884 A1* | 1/2005 | Lu | G06F 1/10 |
| | | | 716/113 |
| 2005/0268263 A1* | 12/2005 | Sun | G06F 30/3312 |
| | | | 716/114 |
| 2007/0089076 A1* | 4/2007 | Amatangelo | G06F 30/3312 |
| | | | 716/108 |
| 2009/0024888 A1 | 1/2009 | Kurimoto | |
| 2012/0182055 A1* | 7/2012 | Smith | G06F 30/327 |
| | | | 716/136 |
| 2015/0332757 A1 | 11/2015 | Lin et al. | |
| 2019/0238142 A1 | 8/2019 | Zerbe et al. | |
| 2021/0382518 A1* | 12/2021 | Uytterhoeven | H03K 5/135 |
| 2023/0057828 A1* | 2/2023 | Rao | G06F 30/396 |

\* cited by examiner

BALANCING CYCLE STEALING WITH EARLY MODE VIOLATIONS

BACKGROUND

The present invention relates to the field of electronic circuit design, more particularly, to methods and systems for designing and configuring local clock buffers within electronic circuits.

Electronic circuits, including integrated circuits, can include digital logic elements, such as latches or flip-flops, that can be driven or controlled using clock signals. For an electronic circuit that includes multiple, sometimes relatively large amount, of digital logic elements, local clock buffers (LCBs) can be employed to generate and distribute synchronizing clock signals to control timing and flow of signals within the integrated circuit. In an example, a global clock signal can be provided as a timing reference, and the LCBs can be configured to generate the synchronizing clock signals based on the global clock signal, and distribute the synchronizing clock signals to the digital logic elements.

SUMMARY

The summary of the disclosure is given to aid understanding of integrated circuit design and configuration methods and/or systems, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the techniques, methods, and/or systems for designing and configuring integrated circuits to achieve different effects.

In some examples, a method for designing a circuit is generally described. The method may include detecting a timing violation on a signal path connected to a local clock buffer in a circuit model. The local clock buffer may be configured to generate a first clock signal having a first pulse width. The method may further include determining a first metric associated with a first type of timing violation. The method may further include determining a second metric associated with a second type of timing violation. The second type of timing violation may be different from the first type of timing violation. The detected timing violation may be one of the first type of timing violation and the second type of timing violation. The method may further include based on the first metric and the second metric, determining whether to retain the generation of the first clock signal or to configure the local clock buffer to generate a second clock signal having a second pulse width different from the first pulse width.

In some examples, a system configured to design a circuit is generally described. The system may include a memory configured to store circuit design data of a circuit model. The circuit model may include a local clock buffer. The system may further include a processor configured to be in communication with the memory. The processor may be configured to run a timing analysis engine on the circuit design data to detect a timing violation on a signal path connected to the local clock buffer in the circuit model. The local clock buffer may be configured to generate a first clock signal having a first pulse width. The processor may be further configured to run an optimization tool to determine a first metric associated with a first type of timing violation. The optimization tool may determine a second metric associated with a second type of timing violation. The second type of timing violation may be different from the first type of timing violation. The detected timing violation may be one of the first type of timing violation and the second type of timing violation. The optimization tool may be configured to, based on the first metric and the second metric, determine whether to retain the generation of the first clock signal or to configure the local clock buffer to generate a second clock signal having a second pulse width different from the first pulse width.

In some examples, a computer program product for designing a circuit is generally described. The computer program product may include a non-transitory computer readable storage medium having program instructions embodied therewith. The program instructions may be executable by a processing element to run a timing analysis engine to detect a timing violation on a signal path connected to a local clock buffer in a circuit model. The local clock buffer may be configured to generate a first clock signal having a first pulse width. The processing element may run an optimization tool to determine a first metric associated with a first type of timing violation. The optimization tool may determine a second metric associated with a second type of timing violation. The second type of timing violation being different from the first type of timing violation. The detected timing violation may be one of the first type of timing violation and the second type of timing violation. The optimization tool may, based on the first metric and the second metric, determine whether to retain the generation of the first clock signal or to configure the local clock buffer to generate a second clock signal having a second pulse width different from the first pulse width.

Further features as well as the structure and operation of various embodiments are described in detail below with reference to the accompanying drawings. In the drawings, like reference numbers indicate identical or functionally similar elements.

DETAILED DESCRIPTION

The various aspects, features, and embodiments of methods, techniques, products, instruction programming, and/or systems for designing and configuring integrated circuit designs will be better understood when read in conjunction with the figures provided. Embodiments are provided in the figures for the purpose of illustrating aspects, features, and/or various embodiments of the methods, techniques, products, instruction programming, and/or systems for testing, checking, and/or verifying integrated circuit designs, but the claims should not be limited to the precise arrangement, structures, features, aspects, assemblies, subassemblies, systems, circuitry, functional units, embodiments, methods, processes, or devices shown, and the arrangements, structures, assemblies, subassemblies, functional units, features, aspects, methods, processes, circuitry, embodiments, and devices shown may be used singularly or in combination with other arrangements, structures, assemblies, subassemblies, systems, features, functional units, aspects, circuitry, embodiments, methods, processes, and devices.

Unless otherwise specifically defined herein, all terms are to be given their broadest possible interpretation including meanings implied from the specification as well as meanings understood by those skilled in the art and/or as defined in dictionaries, treatises, etc.

Figure 1:
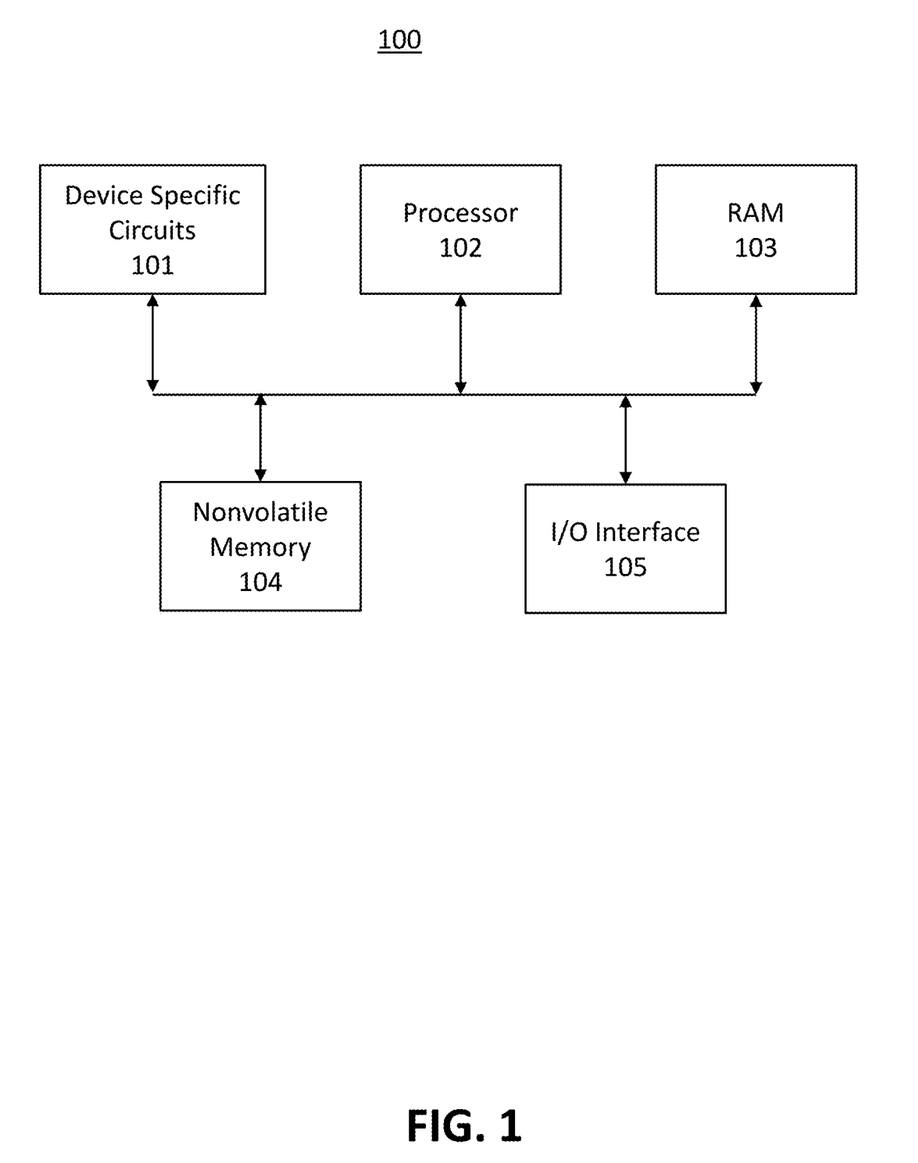
FIG. 1 depicts a general computing or data processing system in accordance with an embodiment.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2A:
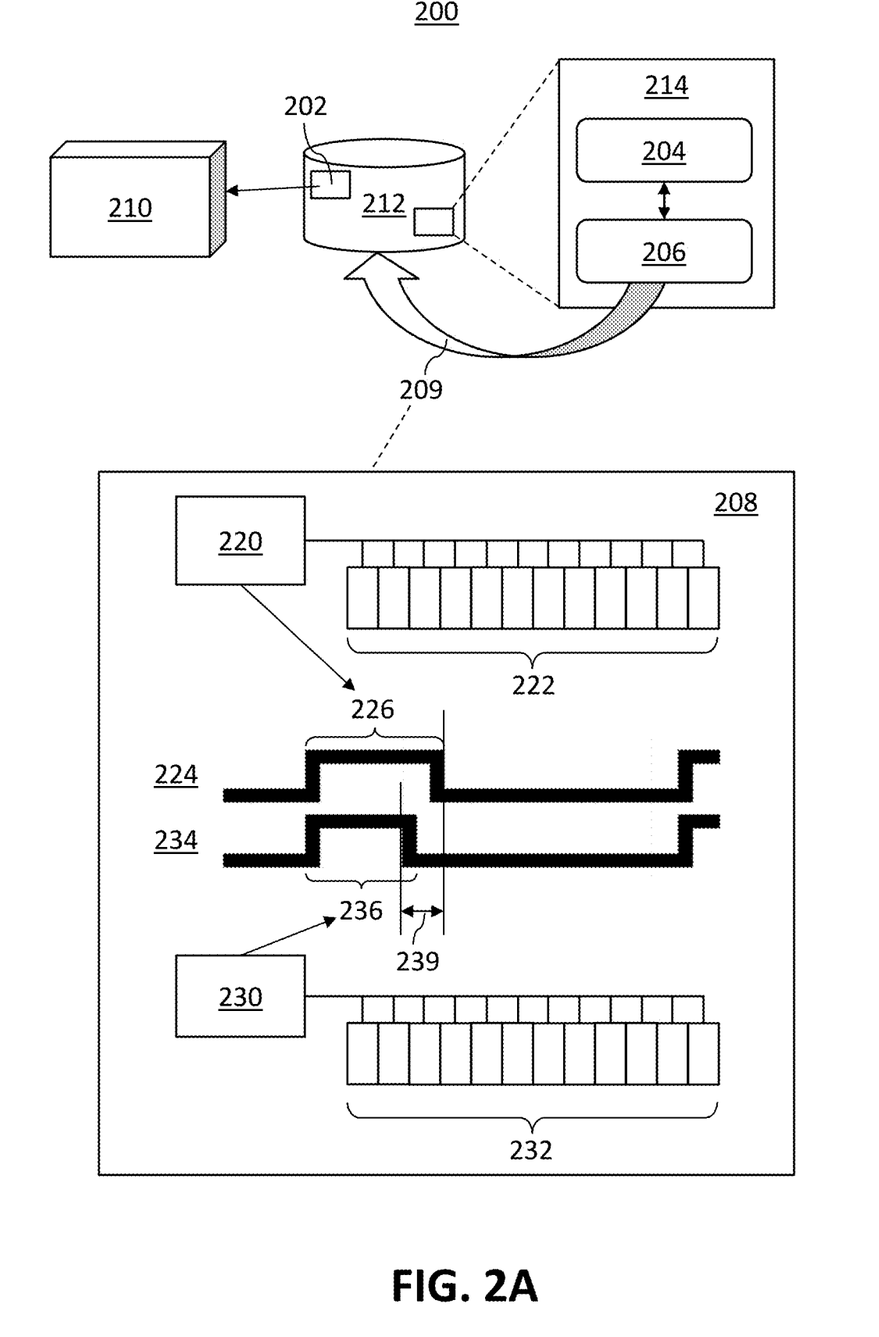
FIG. 2A illustrates an example system that can implement balancing cycle stealing with early mode violations in accordance with an embodiment.

FIG. 2A illustrates an example system 200 that can implement balancing cycle stealing with early mode violations in accordance with an embodiment. The system 200 can include a processor 210 and a memory 212 configured to be in communication with one another. In an example, the processor 210 and the memory 212 can be components of a computing device. For example, the processor 210 can be a central processing unit (CPU) of a computing device and the memory 212 can include one or more memory devices (e.g., volatile and/or nonvolatile memory). The memory 212 can be configured to store circuit design data 202 and a set of tools 214 that includes instructions (e.g., source code, executable code, scripts, etc.) that can be executed by the processor 210 to perform different aspects of electronic circuit design and modeling. For example, a tool 204 and a tool 206 can be stored as scripts among the set of tools 214, such that the processor 210 may run the tools 204 and 206 while running the set of tools 214.

In an example, the tool 204 can be a timing analysis engine for performing timing analysis, and the tool 206 can be an optimization tool for optimizing configurations of local clock buffers in circuit design. It will be apparent to a person of ordinary skill in the art that the set of tools 214 can include additional tools or scripts that can be executed by the processor 210 to perform various aspects of electronic circuit design and modeling. The circuit design data 202 can include data relating to various configurations, parameters, properties, attributes, requirements, and/or constraints, etc., of an electronic circuit being designed, and that is yet to be produced or manufactured—such as a circuit model 208 (or circuit 208). In an example, the circuit design data 202 can include a circuit model represented as a netlist described in a hardware description language (HDL). In an example, the netlist among the circuit design data 202 may represent connection relationships among nodes of the circuit 208. In an example, the netlist may further include parasitic data information and/or design constraints such as timing constraints required by the circuit 208.

In design and development of electronic circuits, timing analysis can be performed to test whether the electronic circuits satisfy particular signal timing requirements. The timing analysis can include running early mode tests and late mode tests. In an example, a late mode test can identify logic paths that may be too slow. These slow logic paths can cause an expected result to become available later (e.g., by one cycle). The late mode test can be performed under a condition where clock signals are configured to be relatively faster and data signals are configured to be relative slower. In an example, late mode violations can occur when a transition of a data signal (e.g., logic low to logic high, or logic high to logic low) occurs later than a transition of a clock signal such that the data signal is not completely transmitted.

In an example, an early mode test can identify logic paths that may be too fast. These fast logic paths can cause an expected result to become available too early (e.g., one cycle early). The early mode test can be performed under a condition where the clock signals are configured to be relatively slower and the data signals are configured to be relative faster. In an example, early mode violations can be referred to as "hold violations" or "fast paths". In an example, early mode violations can occur when a transition of a data signal (e.g., logic low to logic high, or logic high to logic low) occurs prior to a transition of a clock signal and causes, for example, two data signal transitions to occur within one clock cycle. The tool 204 shown in FIG. 2A can be executed by the processor 210 to run timing analysis on the circuit design data 202 in order to identify presence of early mode, late mode, and/or other types of timing violations of the circuit 208 being designed.

Figure 2B:
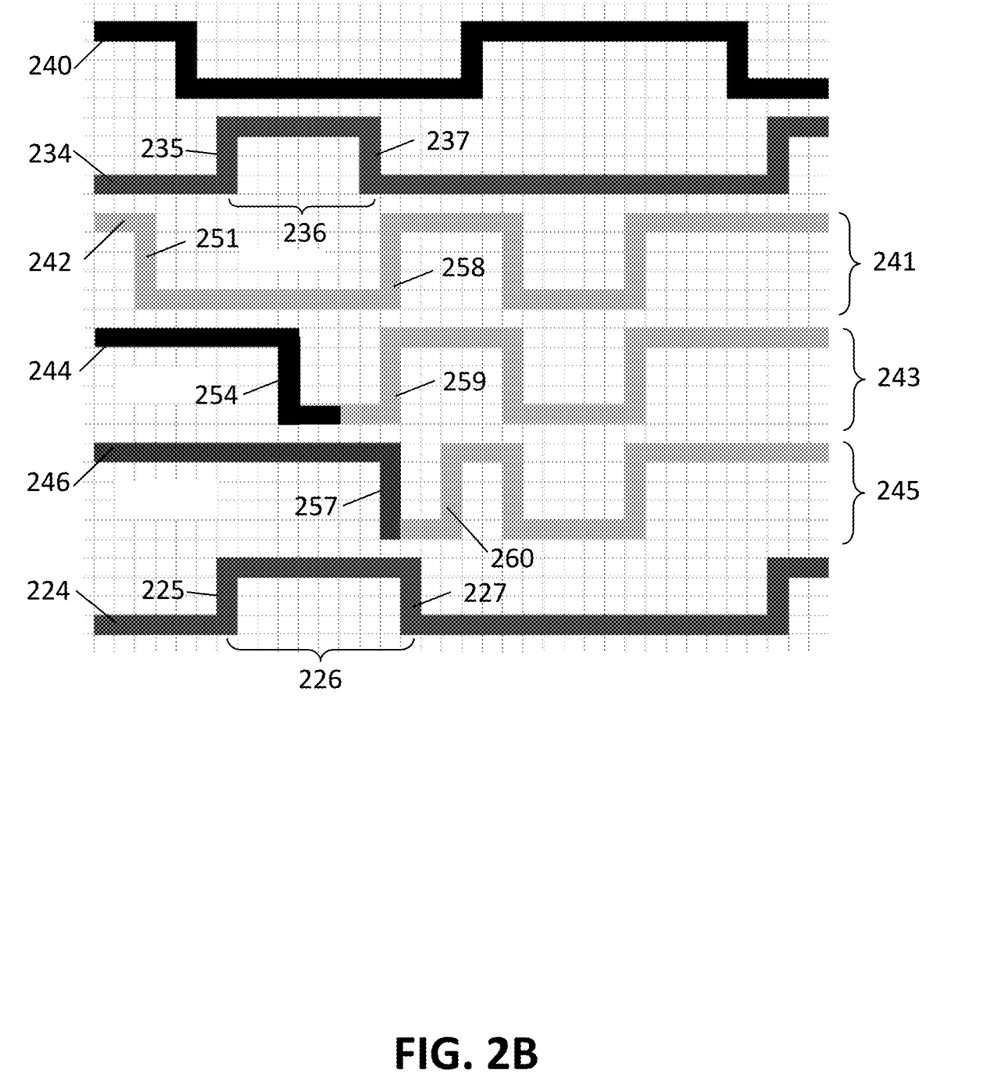
FIG. 2B illustrates one or more timing diagrams of various clock signals and data signals in accordance with an embodiment.

Referring to FIGS. 2A and 2B, a local clock buffer (LCB) 230 may operate under a global clock signal 240, and may generate a local clock signal 234 having a pulse width 236. A signal path 241 for a data signal 242 can be considered as not having a late mode violation because its first falling edge 251 arrives before a first rising edge 235 of the local clock signal 234. In an example, a first falling edge 254 of another data signal 244 arrives later than the first rising edge 235 of the local clock signal 234, which may indicate a late mode violation in some scenarios. However, real adjust or cycle stealing can be applied to the data signal 244 during timing analysis (e.g., the tool 204 run by processor 210) and hence, there is no late mode violation in the signal path 243 because the first falling edge 254 of the data signal 244 arrives before a first falling edge 237 of the local clock signal 234.

In another example, another signal path 245 with data signal 246 has its first falling edge 257 arrive later than the first rising edge 235 of the local clock 234. Even with the application of maximum real adjust, which is equivalent to the pulse width 236 of the local clock signal 234, this results in a late mode violation, since the first falling edge 257 of the data signal 246 arrives later than the first falling edge 237 of the local clock signal 234. In an example, to eliminate the late mode violation of the signal path 245, the local clock buffer 230 can be configured to generate a local clock signal 224 having a wider pulse width 226, instead of the local clock signal 234. As a result of using the wide pulse width local clock signal 224, the late mode violation of the signal path 245 can be addressed because the first falling edge 257 of the data signal 246 arrives earlier than a first falling edge 227 of the local clock signal 224. However, the signal paths 241 and 243 can have early mode violations because their subsequent transitions, such as rising edges 258 and 259, respectively, arrives earlier than a first falling edge 227 of the clock signal 224. In other words, before the end of the first clock cycle (e.g., the first falling edge 227 of clock signal 224), the data signals 242 and 244 have two signal transitions, which may not be desirable.

In an example, conventional techniques to address early mode violations can include inserting delay cells or pads along the logic paths with early mode violations. However, the number of pads can increase with a number of circuit components and can occupy additional silicon area, and can lead to problems with routability. To reduce the amount of delay cells or pads insertion in order to preserve chip area, the tool 206 can be added or incorporated in the set of tools 214, such that the set of tools 214 may be improved by being able to run a design optimization process (e.g., process 300 in FIG. 3 and process 400 in FIG. 4 described below). The tool 206 can identify a group of signal paths or logic elements, such as latches, connected to a local clock buffer that may have early mode violations. The tool 206 can determine metrics for the identified group of signal paths, and determine whether each local clock buffer among the circuit 208 should be designed to have a first (default) pulse width or should be modified to a local clock buffer design that generates a local clock signal with a second (different) pulse width. The tool 206 can generate configuration data 209 that indicates whether one or more local clock buffers among the circuit 208 have swapped a local clock signal configuration (e.g., configured to generate local clock signal with different pulse width), or retained a clock signal configuration (e.g., continue to generate local clock signal with default pulse width). In an example, the circuit design data 202 may indicate the default pulse width of local clock signals generated by each local clock buffer among the circuit 208. The tool 206 can update the circuit design data 202 using the configuration data 209 to update a design reflecting an optimized configuration of local clock buffers of the circuit 208.

For example, for a local clock buffer having a default local clock signal of a wide pulse width, if a relatively large amount of signal paths are exposed to early mode violation, it may be beneficial to swap the local clock buffer to generate local clock signals having a narrow pulse width. The swapping can reduce the number of signal paths exposed to early mode violations, thus reducing the amount of measures (e.g., delay cells and pads insertion) needed to address the early mode violation exposure. In another example, if a relatively small amount of signal paths are exposed to early mode violation for a local clock buffer having a default local clock signal of a wide pulse width, it may be not be beneficial to swap to a narrow pulse width because the swapping may cause additional late mode violations. Therefore, the tool 206 can optimize each local clock buffer in an electronic circuit by individually selecting the local clock buffers to have clock signals that can balance the logic elements' exposure to early mode violations and late mode violations. Configuring to use clock signals of different pulse width can reduce the need to insert delay cells and can reduce the amount of circuit board space occupied by delay cells without affecting routability. Further, configuring to use clock signals of different pulse width can allow both cycle stealing (for signal paths exposed to late mode violations) and delay cell or gate insertions to be performed on an electronic circuit, providing flexibility in designing the electronic circuit based on different timing constraints and requirements. For example, an electronic circuit can be configured to have relatively more local clock buffers using a wide pulse width clock signal, and relatively less local clock buffers using a narrow pulse width clock signal, when a design goal indicates that addressing late mode violations is more important than addressing early mode violations.

In an example shown in FIG. 2A, a local clock buffer 220 among the circuit 208 being designed is shown connected to a plurality of logic elements 222, where, for example, the logic elements 222 can be latches. Another local clock buffer 230 among the circuit 208 being designed is shown connected to a plurality of logic elements 232, where, for example, the logic elements 232 can be another set of latches different from the logic elements 222. The processor 210 can run the tool 206 to configure the local clock buffer 220 to generate the clock signal 224 having a pulse width 226, and configure the local clock buffer 230 to generate the clock signal 234 having a pulse width 236, where the pulse width 236 is narrower or less than the pulse width 226 of the clock signal 224. The local clock buffers 220 and 230 can generate the clock signals 224 and 234 using a global clock signal 240 (shown in FIG. 2B), respectively. The global clock signal 240 can be generated by a clock generator connected to the local clock buffers 220 and 230. In an example, the pulse width 226 can be referred to as a wide pulse width, and the pulse width 236 can be referred to as a narrow pulse width. The values of the pulse width 226 and the pulse width 236 can be arbitrary and can be predefined. Although two local clock buffers 220, 230 and two sets of logic elements 222, 232 are shown in FIG. 2A, it will be apparent to a person of ordinary skill in the art that the tool 206 can configure additional local clock buffers connected to additional logic elements, and the logic elements can include different types of logic elements (e.g., other than latches).

In an example, the processor 210 may run the tool 204 to perform static timing analysis (STA) on the circuit design data 202 (e.g., a netlist for the circuit 208 being designed). The STA may determine or compute early mode slack time and late mode slack time for each latch and local clock buffers in the circuit 208 being designed. In the example shown in FIG. 2B, early mode slack time is computed by the STA based on relative position of a first rising edge (e.g., 258, 259, or 260) of a data signal (e.g., 241, 243 or 245) to the first falling edge (e.g., 237, 227) of local clock signals (e.g., 234, 224). A positive value of early mode slack time may indicate the first rising edge of a data signal arrives after the first falling edge of a local clock signal. A negative value of the early mode slack time may indicate the first rising edge of a data signal arrives before the first falling edge of the local clock signal. An absolute value of an early mode slack time indicates a magnitude of a time difference between the first rising edge of a data signal and the first falling edge of a local clock signal.

Similarly, late mode slack time is computed by STA (e.g., tool 204) based on relative position of the first falling edge (e.g., 251, 254, 257) of a data signal (e.g., 241, 243, or 245) to the first rising edge (e.g., 235 and 225) of the local clock signals (e.g., local clock signals 234 and 224). A positive value of late mode slack time may indicate first falling edge of a data signal arrives before the first rising edge of a local clock signal. A negative value of late mode slack time may indicate the first falling edge of the data signal arrives after the first rising edge of the local clock signal. The absolute value of a late mode slack time indicates a magnitude of a time difference between the first falling edge of a data signal and a first rising time of a local clock signal. For late mode analysis, a final late mode slack time can be computed after a real adjust (RA) or cycle steal adjust is added to a late mode slack time in response to the late mode slack time being a negative value. In an example, the maximum value of RA or cycle steal adjust can be the pulse width of the clock signal (e.g., 236 or 226 shown in FIG. 2A and FIG. 2B).

Figure 3:
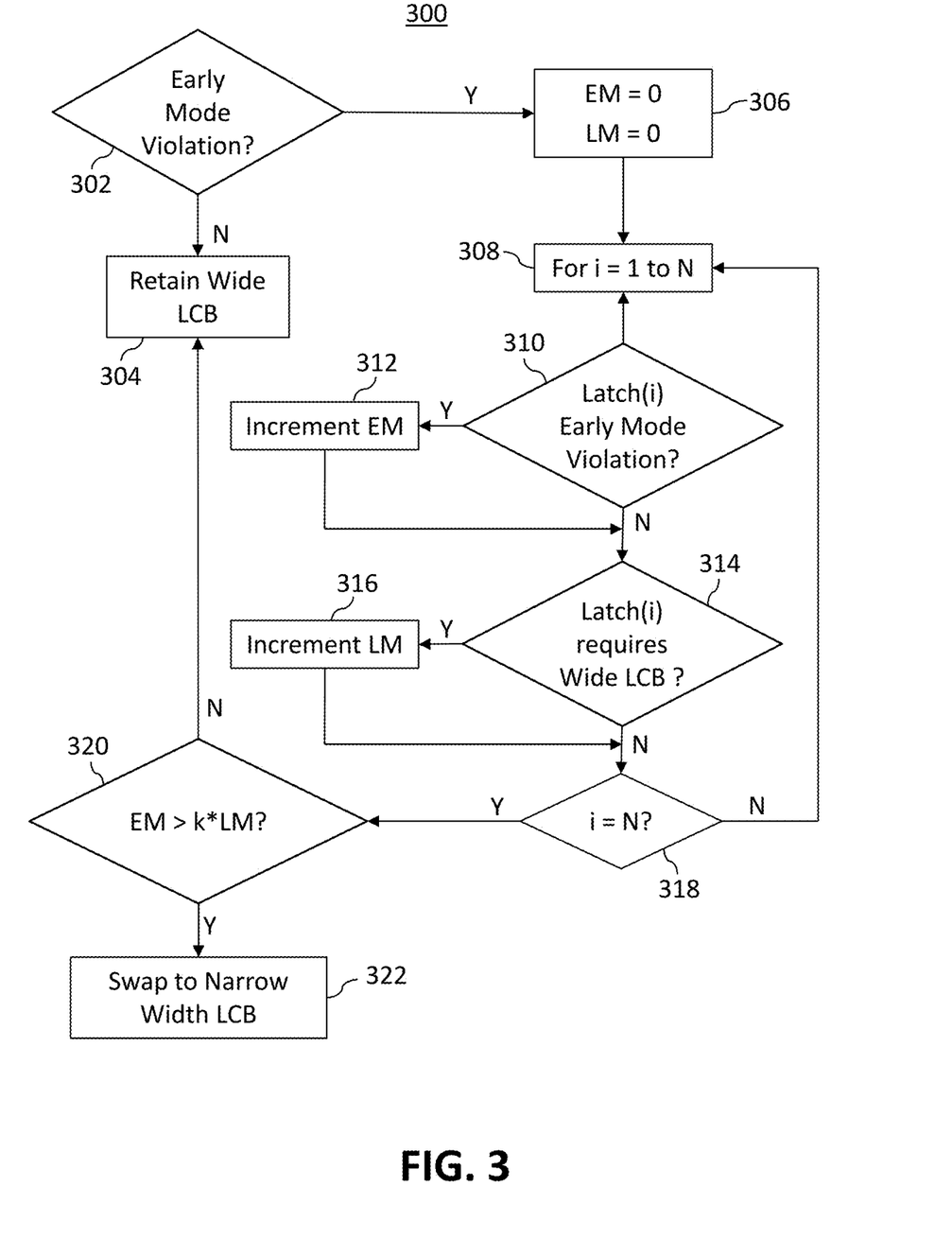
FIG. 3 illustrates an example process of configuring a local clock buffer in accordance with an embodiment.

FIG. 3 illustrates an example process 300 of configuring a local clock buffer in accordance with an embodiment. The process 300 can include one or more operations, actions, or functions as illustrated by one or more of blocks 302, 304, 306, 308, 310, 312, 314, 316, 318, 320, and/or 322. Although illustrated as discrete blocks, various blocks can be divided into additional blocks, combined into fewer blocks, eliminated, performed in parallel, and/or performed in a different order, depending on the desired implementation.

The process 300 can be a circuit design optimization process to optimize a configuration of local clock buffers of a circuit being designed (e.g., circuit 208 in FIG. 2A). The process 300 can optimize local clock buffers that generate local clock signals with a wide pulse width by default (e.g., clock signal 224 with pulse width 226 shown in FIGS. 2A and FIG. 2B). In an example, the processor 210 shown in FIG. 2A can run the set of tools 214, including the tool 204 and the tool 206, to implement the process 300.

The process 300 can start at block 302. At block 302, the tool 204 may detect and/or determine whether at least one signal path connected to a local clock buffer among the circuit 208 is exposed to early mode violations. At least one signal path can be connected between the local clock buffer and a plurality of logic elements in the circuit 208. In an example, the tool 204 can be a timing analysis engine that performs static timing analysis on a netlist among the circuit design data 202 (see FIG. 2A) to identify early mode violation indicators, late mode violation indicators, delays (e.g., amount of delay in time unit), and/or other types of detected warnings, issues, errors, etc., in the design of the circuit 208. In response to no early mode violation exposure detected for the local clock buffer (302: No), the process 300 can proceed from block 302 to block 304. At block 304, the default pulse width (e.g., wide pulse width) of the local clock buffers among the circuit design data 202 can be retained. In response to detecting exposure to an early mode violation on the at least one signal path (302: Yes), the process 300 can proceed from block 302 to block 306.

At block 306, the tool 206 can initialize or reset an early mode (EM) metric and a late mode (LM) metric to zero. In response to the default pulse width of the LCB local clock signal being a wide pulse width, the EM metric can be a metric representing a swap benefit, such as a benefit from swapping or configuring the local clock buffer to generate a clock signal having a narrow pulse width. In an example, the EM metric can be an accumulated amount of swap benefits of a first group of signal paths, connected to the local clock buffer, that are exposed to early mode violations. In response to the default pulse width of the LCB local clock signal being a wide pulse width, the LM metric can be a metric representing a retain benefit, such as a benefit from retaining the generation of the clock signal having a wide pulse width. In an example, the LM metric can be based on an accumulated amount of retain benefits of a second group of signal paths, connected to the local clock buffer, that are exposed to late mode violations.

The process 300 can proceed from block 306 to block 308. At block 308, the tool 206 can index N logic elements connected to the local clock buffer. Blocks 310, 312, 314, 316, and/or 318 can be performed iteratively for logic elements i to N.

The process 300 can proceed from block 308 to block 310. At block 310, the tool 204 can determine whether a signal path connected to the i-th logic element, or latch(i), is exposed to an early mode violation. In response to the latch(i) (e.g., logic element) not being exposed o early mode violation (310: No), the process 300 can proceed from block 308 to block 314. In response to the latch(i) being exposed to an early mode violation (310: Yes), the process can proceed from block 310 to block 312.

At block 312, the tool 206 can increment the EM metric in response to exposure to an early mode violation on latch(i). In an example, an amount to increment the EM metric can be based on based on 1) a difference between an early mode slack time of the latch(i), and 2) a pulse width difference 239 (see FIG. 2) between the wide pulse width 226 and the narrow pulse width 236. The tool 206 may compare an absolute value of the early mode slack time of the latch(i) with an absolute value of the pulse width difference 239. Based on the comparison, the tool 206 may set the lower value of the two compared absolute values to be the amount being incremented or added to the EM metric. In an first example, if the absolute value of the early mode slack time for latch(i) is less than the absolute value of the pulse width difference 239, then the absolute value of the early mode slack time for the latch(i) will be added to the EM metric. This first example represents a case, where a swap from wide pulse to a narrow pulse width LCB causes the early mode violation of latch(i) to no longer be a violation, due to the relative shift in the first falling edge of the local clock signal (e.g., from 227 to 237). In a second example, if the absolute value of the early mode slack time is greater than the absolute value of the pulse width difference 239, then the absolute value of the pulse width different 239 will be added to the EM metric. This second example represents a case, where a swap from a wide pulse width to a narrow pulse width reduces a magnitude of the early mode violation (or the early mode slack time) for latch(i). The process 300 can proceed from block 312 to block 314.

At block 314, the tool 204 can determine whether the i-th logic element, or latch(i), requires a wide pulse width LCB by evaluating if it has an applied real adjust that is greater than the narrow pulse width 236. In an example, if a signal path is exposed to an early mode violation, the signal path may not be exposed to late mode violation, and vice versa. In another example, a signal path may be exposed to both late and early mode violations in relation to different signals arriving at the latch input. In response to the latch(i) having a real adjust greater than the narrow pulse width (314: Yes), the process 300 can proceed from block 314 to block 316. In response to the latch(i) having a real adjust smaller than the narrow pulse width (314: No), the LM metric may not be incremented and the process 300 can proceed from block 314 to block 318.

At block 316, the tool 206 can increment the LM metric in response to latch(i) having a real adjust greater than the narrow pulse width 236. The tool 204 may determine a real adjust time indicating an amount of the real adjust or cycle stealing applied to the given latch(i). In an example, the real adjust time can be the pulse width 226. In an example, the latch(i) is considered as not being exposed to a late mode violation as long as a data transition arrives within the pulse width of the local clock signal (e.g., pulse width 226 of signal 224 shown in FIG. 2B). However, in response to swapping the LCB from wide pulse width to narrow pulse width, the late mode slack time of latch(i) may be decreased by the pulse width difference 239 (e.g., the difference between 226 and 236). In an example, the late mode slack of latch(i) may become less than 0. The tool 206 may compute the difference between the real adjust time and the narrow pulse width 236 to calculate the benefit of retaining the LCB with a wide pulse width. The tool 206 can accumulate or add this benefit to increment the LM metric. In an example, in response to the real adjust being greater than the narrow pulse width 236 and being greater than the late mode slack time, the LM metric may be incremented by the difference between the real adjust time and the narrow pulse width 236. In another example, in response to the real adjust being greater than the narrow pulse width 236 and being less than the late mode slack time, the LM metric may not be incremented. The process 300 can proceed from block 316 to block 318.

At block 318, the tool 206 can determine whether the index i is equal to N. If the index i is not equal to N (318: No), then the process 300 can return to block 308, where the tool 206 can increment the index i (e.g., set i=i+1) to perform the blocks 310, 312, 314, 316, and/or 318 on a next latch or logic element. If the index i is equal to N (318: Yes), then this equivalence indicates that the last logic element or latch connected to the local clock buffer has been optimized by the tool 206, and the process 300 can proceed from block 318 to block 320.

At block 320, the EM metric is compared with a weighted value of the metric LM. A parameter k can be used for determining the weighted value of the LM metric. The value of k can be based on a user preference on the importance of addressing either early mode violation or late mode violation. For example, if addressing early mode violation and late mode violation are equally important, then k can be set, e.g., by the tool 206, to 1. If addressing early mode violations are more important than addressing late mode violations, then k can be set to less than 1. If addressing late mode violations are more important, then k can be set to greater than 1. In response to the EM metric being less than the weighted LM (e.g., k*LM), the process 300 can return to block 304, where the wide pulse width of the local clock buffer can be retained. In response to the EM metric being greater than the weighted LM (e.g., k*LM), the process 300 can proceed from block 320 to block 322. At block 322, the local clock buffer is configured to generate clock signals having the narrow pulse width.

Figure 4:
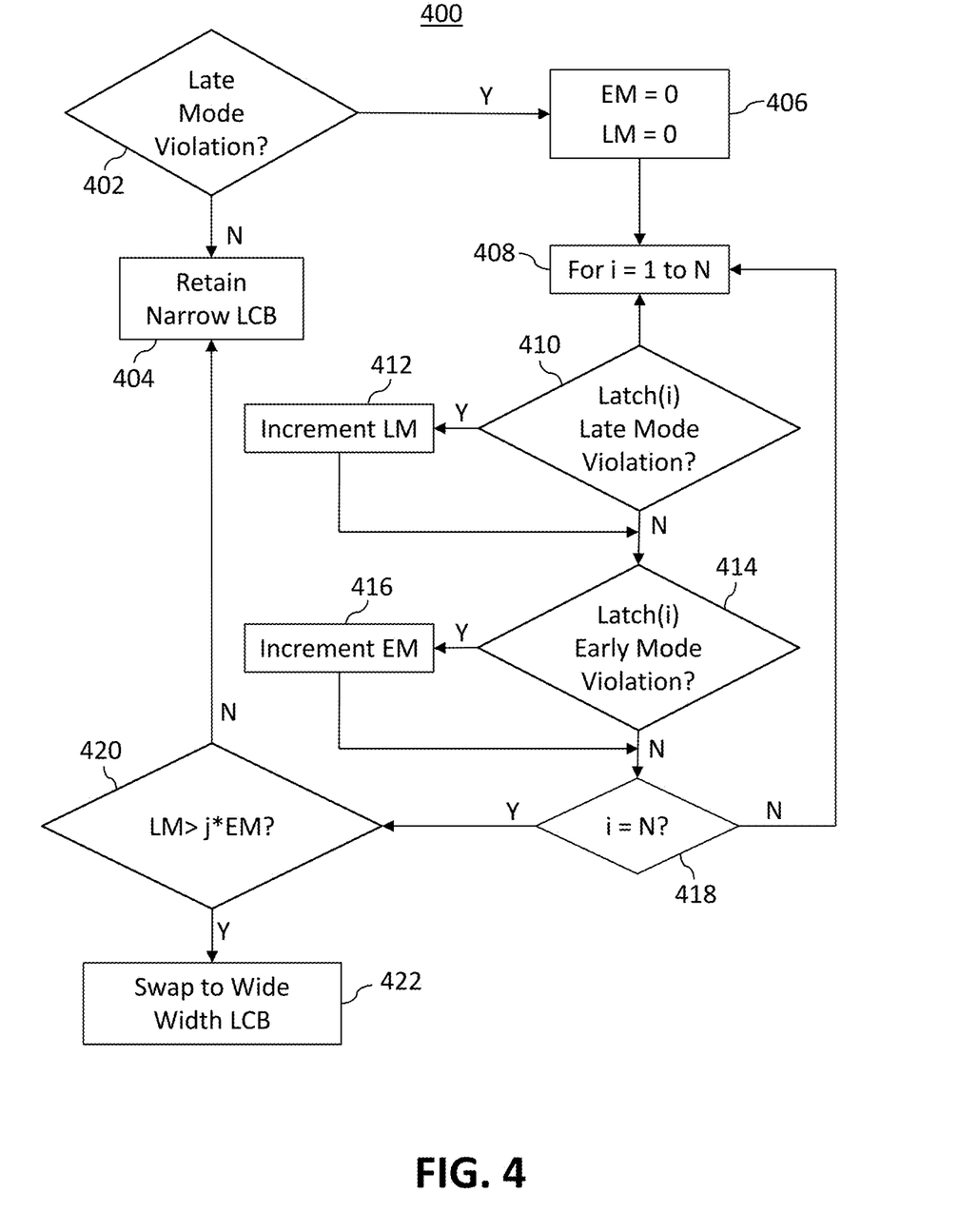
FIG. 4 illustrates another example process of configuring a local clock buffer in accordance with an embodiment.

FIG. 4 illustrates another example process of configuring a local clock buffer in accordance with an embodiment. The process 400 can include one or more operations, actions, or functions as illustrated by one or more of blocks 402, 404, 406, 408, 410, 412, 414, 416, 418, 420, and/or 422. Although illustrated as discrete blocks, various blocks can be divided into additional blocks, combined into fewer blocks, eliminated, performed in parallel, and/or performed in a different order, depending on the desired implementation.

The process 400 can be a circuit design optimization process to optimize a configuration of local clock buffers of a circuit being designed (e.g., circuit 208 in FIG. 2A). The process 400 can optimize local clock buffers that generate local clock signals with a narrow pulse width by default (e.g., clock signal 234 with pulse width 236 shown in FIGS. 2A and FIG. 2B). In an example, the processor 210 shown in FIG. 2A can run the set of tools 214, including the tool 204 and the tool 206, to implement the process 400.

The process 400 can start at block 402. At block 402, the tool 204 can detect and/or determine whether at least one signal path connected to a local clock buffer (e.g., the local clock buffer under test) among the circuit 208 is exposed to late mode (LM) violations. The at least one signal paths can be connected between the local clock buffer and a plurality of logic elements in the circuit 208. In an example, the tool 204 can be a timing analysis engine that performs static timing analysis on a netlist among the circuit design data 202 (see FIG. 2A) to identify early mode (EM) violation indicators, late mode (LM) violation indicators, delays (e.g., amount of delay in time unit), and/or other types of detected warnings, issues, errors, etc., in the design of the circuit 208. In response to no late mode (LM) violation exposure detected for the local clock buffer (402: No), the process 400 can proceed from block 402 to block 404. At block 404, the default pulse width (e.g., narrow pulse width) of the local clock buffers among the circuit 208 can be retained. In response to detecting exposure to a late mode violation on the at least one signal path (402: Yes), the process 400 can proceed from block 402 to block 406.

At block 406, the tool 206 can initialize or reset the EM and LM metrics to zero. In response to the default pulse width of the LCB local clock signal being a narrow pulse width, the LM metric can be a metric representing a swap benefit, such as a benefit from swapping or configuring the local clock buffer to generate a clock signal having a wide pulse width. In an example, the LM metric can be an accumulated amount of swap benefits of a first group of signal paths, connected to the local clock buffer, that are exposed to late mode violations. In response to the default pulse width of the LCB local clock signal being a narrow pulse width, the EM metric can be a metric representing a retain benefit, such as a benefit from retaining the generation of the clock signal having a narrow pulse width. In an example, the EM metric can be based on an accumulated amount of retain benefits of a second group of signal paths, connected to the local clock buffer, that are exposed to early mode violations.

The process 400 can proceed from block 406 to block 408. At block 408, the tool 206 can index N logic elements connected to the local clock buffer. Blocks 410, 412, 414, 416, and/or 418 can be performed iteratively for logic elements i to N.

The process 400 can proceed from block 408 to block 410. At block 410, the tool 204 can determine whether a signal path connected to the i-th logic element, or latch(i), is exposed to late mode (LM) violation. In response to the latch(i) (e.g., logic element) not being exposed to late mode (LM) violation (410: No), the process can proceed from block 408 to block 414. In response to the latch(i) being exposed to a late mode (LM) violation (410: Yes), the process can proceed from block 410 to block 412.

At block 412, the tool 206 can increment the LM metric in response to exposure to a late mode (LM) violation being present at latch(i). The tool 206 may compare an absolute value of the late mode slack time of the latch(i) with an absolute value of the pulse width difference 239. Based on the comparison, the tool 206 may set the lower value of the two compared absolute values to be the amount being incremented or added to the LM metric. Note that the LM metric being used in the process 400 can represent an estimation of a benefit to swap or configure the local clock buffer to generate a clock signal having a wide pulse width. The process 400 can proceed from block 412 to block 414.

At block 414, the tool 206 can determine whether the i-th logic element, or latch(i), is exposed to early mode violations. In an example, if a signal path is exposed to any late mode (LM) violation, the signal path may not be exposed to early mode (EM) violation, and vice versa. In another example, a signal path may be exposed to both late and early mode violations in relation to different signals arriving at the latch input. In response to the latch(i) being exposed to an early mode (EM) violation (414: Yes), the process 400 can proceed from block 414 to block 416. In response to the latch(i) not being exposed to an early mode (EM) violation (414: No), the process 400 can proceed from block 414 to block 418.

At block 416, the tool 206 can increment the EM metric in response to latch(i) being exposed to an early mode (EM) violation. The tool 206 can determine the early mode slack time of the early mode (EM) violation of latch(i), such as a relative position of the second transition (e.g., first rising edge) of a data signal to a first falling edge (e.g., 237) of the clock signal with the narrow pulse width. Additionally, the tool 206 can compute a cost of swapping to a wide width LCB as the absolute value of the difference between the early mode violation of the latch (i) and the pulse width difference 239. Note that swapping from a narrow pulse width to a wide pulse width may increase the early mode slack time. The tool 206 may determine the amount to be incremented or added to the EM metric (the determination being similar to block 312 of FIG. 3). The process 400 can proceed from block 412 to block 414.

At block 418, the tool 206 can determine whether the index i is equal to N. If the index i is not equal to N (418: No), then the process 400 can return to block 408, where the tool 206 can increment the index i (e.g., set i=i+1) to perform the blocks 410, 412, 414, 416, and/or 418 on a next latch or logic element. If the index i is equal to N (418: Yes), then this equivalence indicates that the last logic element or latch connected to the local clock buffer has been optimized by the tool 206, and the process 400 can proceed from block 418 to block 420.

At block 420, the tool 206 can compare the LM metric with a weighted value of the EM metric. A parameter j can be used for determining the weighted value of the EM metric. The value of j can be based on a user preference on the importance of addressing either early mode (EM) violation or late mode (LM) violation. For example, if addressing late mode (LM) violation and early mode (EM) violation are equally important, then j can be set, e.g., by the tool 206, to 1. If addressing late mode violations are more important than addressing early mode violations, then j can be set to less than 1. If addressing early mode (EM) violations are more important than addressing late mode (LM) violations, then j can be set to greater than 1. In response to the LM metric being less than the weighted EM metric (e.g., j*LM), the process 400 can return to block 404, where the narrow pulse width of the local clock buffer can be retained. In response to the EM metric being greater than the weighted LM metric (e.g., j*LM), the process 400 can proceed from block 420 to block 422. At block 422, the tool 206 can configure the local clock buffer to generate clock signals having the wide pulse width.

Figure 5:
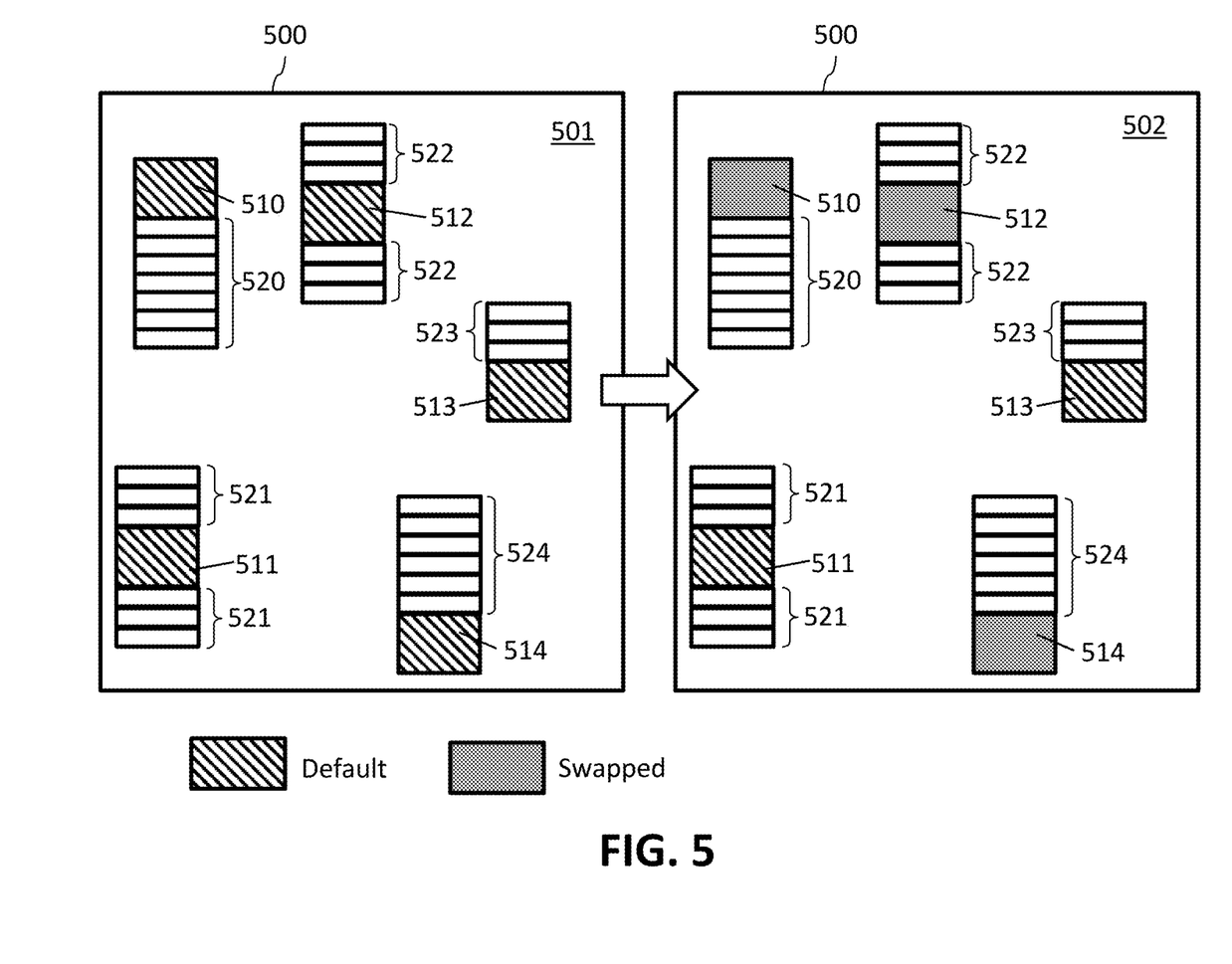
FIG. 5 illustrates a block diagram of a configuration of a circuit resulting from an implementation of the methods and systems described in accordance with an embodiment.

FIG. 5 illustrates a block diagram of a configuration of an electronic circuit 500 resulting from an implementation of the methods and systems described in accordance with an embodiment. In an example, the local clock buffers 220 and 230 and the logic elements 222 and 232 shown in FIG. 2A can be a part of the electronic circuit 500. In the example shown I FIG. 5, the electronic circuit 500 can include a plurality of local clock buffers 510, 511, 512, 513, 514 connected to logic elements (e.g., latches) 520, 521, 522, 523, 524, respectively. In an example shown in FIG. 5, a default configuration 501 of the electronic circuit 500 can set the local clock buffers 510, 511, 512, 513, 514 to a default setting. The default setting under the configuration 501 can cause the local clock buffers 510, 511, 512, 513, 514 generate clock signals having a first pulse width. As a result of implementing the systems and processes described herein (e.g., system 200, and processes 300 and 400), the electronic circuit 500 can be swapped from the configuration 501 to a configuration 502. Under the configuration 502, the local clock buffers 510, 511, 512, 513, 514 can be set to generate clock signals of different pulse width. For example, under the configuration 502, settings of the local clock buffers 511 and 513 are retained to generate clock signals of the first pulse with, and settings of the local clock buffers 510, 512, and 514 are configured to generate clock signals of a second pulse width, where the second pulse width is different from the first pulse width. The configuration 502, when compared to the configuration 501, can reduce the need to insert delay cells and can reduce the amount of circuit board space occupied by delay cells without affecting routability.

In an example, as the number of local clock buffers (LCBs) being swapped increases, the number of delay cells or gates being added to the circuit may decrease. Also, as a result of implementing the process 300, an increase in the number of local clock buffers (LCBs) being swapped can increase the number of late fails (e.g., late mode violations). Similarly, as a result of implementing the process 400, an increase in the number of local clock buffers (LCBs) being swapped can increase the number of early fails (e.g., early mode violations). However, the processes 300 and 400 may optimize the number of late fails, early fails, and the number of delay gates being added, according to a desired design of the electronic circuit by adjusting the weigh (e.g., kin the process 300 or j in the process 400). For example, if a goal of a design is to allow up to 200 late fails with the minimum number of delay gates added, then setting the value of k to a value resulting in a ratio of EM/LM>0.5 (e.g., result #5) may be desirable.

Figure 6:
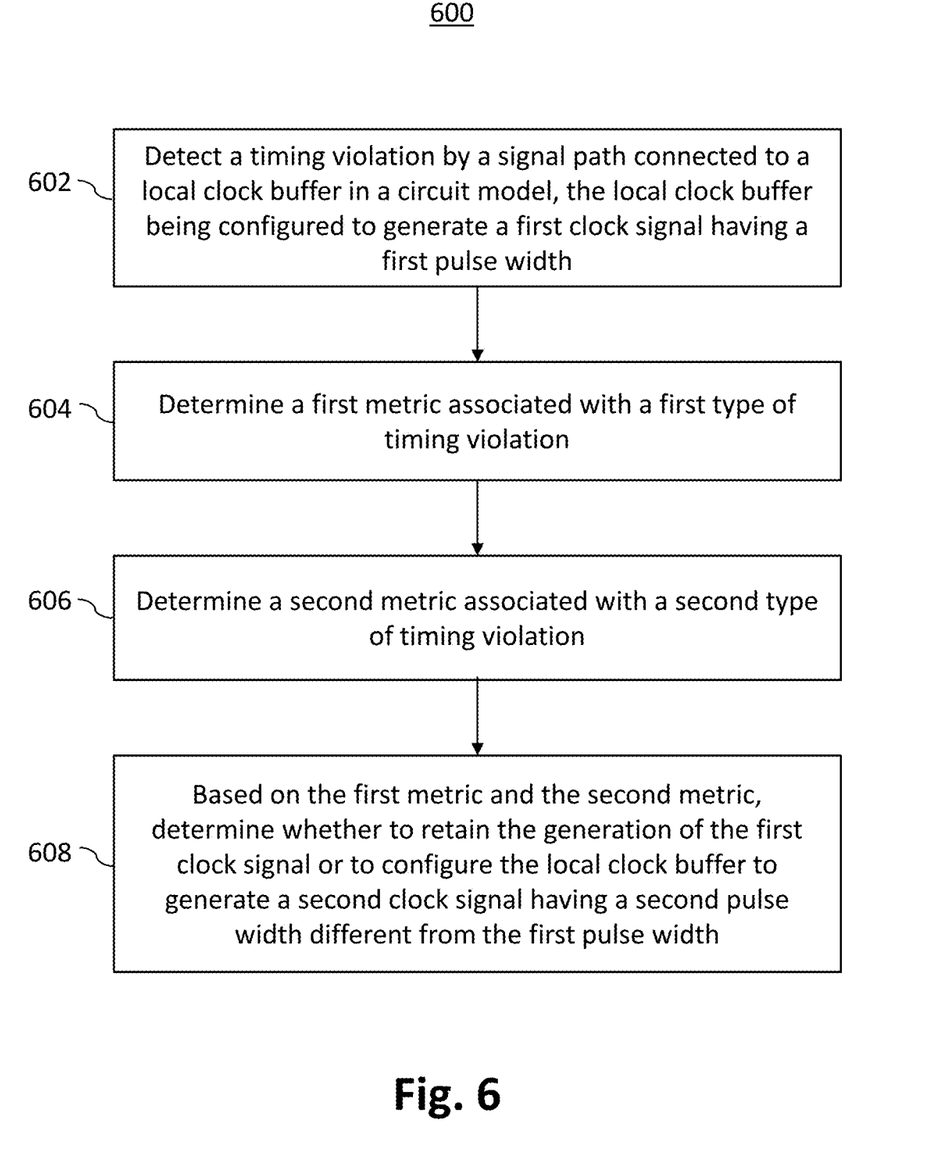
FIG. 6 illustrates an example flowchart example of balancing cycle stealing with early mode violations in accordance with an embodiment.

FIG. 6 illustrates an example flowchart of balancing cycle stealing with early mode (EM) violations in accordance with an embodiment. A process 600 can include one or more operations, actions, or functions as illustrated by one or more of blocks 602, 604, 606, and/or 608. Although illustrated as discrete blocks, various blocks can be divided into additional blocks, combined into fewer blocks, eliminated, performed in parallel, and/or performed in a different order, depending on the desired implementation.

The process 600 may be implemented for designing a circuit. The process 600 may begin at block 602, where a tool may detect a timing violation on a signal path connected to a local clock buffer in a circuit model. The local clock buffer may be configured to generate a first clock signal having a first pulse width.

The process 600 may proceed from block 602 to block 604. At block 604, the tool may determine a first metric associated with a first type of timing violation. The process 600 may proceed from block 604 to block 606. At block 606, the tool may determine a second metric associated with a second type of timing violation. The second type of timing violation may be different from the first type of timing violation. The detected timing violation is one of the first type of timing violation and the second type of timing violation.

In an example, the first type of timing violation may be an early mode violation, the second type of timing violation may be a late mode violation, and the first pulse width may be greater than the second pulse width. In another example, the first type of timing violation may be a late mode violation, the second type of timing violation may be an early mode violation, and the first pulse width may be less than the second pulse width.

The process 600 may proceed from block 606 to block 608. At block 608, the tool may, based on the first metric and the second metric, determine whether to retain the generation of the first clock signal or to configure the local clock buffer to generate a second clock signal having a second pulse width different from the first pulse width.

In an example, the tool may compare the first metric with the second metric. The tool may use a result of the comparison to determine whether to retain the generation of the first clock signal or to configure the local clock buffer to generate the second clock signal.

In an example, the first type of timing violation may be an early mode violation. The tool may determine the first metric by determining an early mode slack time of the signal path. The tool may determine a pulse width difference between the first pulse width and the second pulse width. The tool may identify a smaller value among an absolute value of the slack time and an absolute value of the pulse difference. The tool may determine the first metric using the identified smaller value.

In an example, the second type of timing violation may be a late mode violation. The tool may determine the second metric by detecting an amount of cycle stealing allowed for the signal path. The tool may compare the amount of cycle stealing with a smaller pulse width between either the first pulse width and the second pulse width. The tool may, in response to the amount of cycle stealing being greater than the smaller pulse width, determine a difference between the smaller pulse width and the amount of cycle stealing allowed for the signal path. The tool may determine the second metric using the difference between the smaller pulse width and the amount of cycle stealing allowed for the signal path.

In an example, the tool may detect the first type of timing violation on a first group of signal paths connected to the local clock buffer. The tool may determine the first metric for the first group of signal paths. The tool may detect the second type of timing violation on a second group of signal paths connected to the local clock buffer. The tool may determine the second metric for the second group of signal paths. The tool may accumulate the first metric for the first group of signal paths to generate a first overall metric. The tool may accumulate the second metric for the second group of signal paths to generate a second overall metric. The tool may compare the first overall metric with the second overall metric. The tool may determine whether to retain the generation of the first clock signal or to configure the local clock buffer to generate the second clock signal based on a result of the comparison of the first overall metric with the second overall metric. In an example, the tool may compare the first overall metric with the second overall metric by comparing the first overall metric with a weighed value of the second overall metric. The weight value of the second overall metric may indicate a relative importance between the timing violation and the second timing violation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for designing a circuit, the method comprising:
   detecting a timing violation on a signal path connected to a local clock buffer in a circuit model, the local clock buffer being configured to generate a first clock signal having a first pulse width;
   determining a first metric associated with a first type of timing violation;
   determining a second metric associated with a second type of timing violation, the second type of timing violation being different from the first type of timing violation, and the detected timing violation is one of the first type of timing violation and the second type of timing violation;
   comparing the first metric with the second metric; and
   based on a result of the comparison of the first metric and the second metric, determining whether to retain the generation of the first clock signal or to configure the local clock buffer to generate a second clock signal having a second pulse width different from the first pulse width.

2. The computer-implemented method of claim 1, wherein the first type of timing violation is an early mode violation, and determining the first metric comprises:

determining an early mode slack time of the signal path;
determining a pulse width difference between the first pulse width and the second pulse width;
identifying a smaller value among an absolute value of the slack time and an absolute value of the pulse difference; and
determining the first metric using the identified smaller value.

3. The computer-implemented method of claim 1, wherein the second type of timing violation is a late mode violation, and determining the second metric comprises:
detecting an amount of cycle stealing allowed for the signal path;
comparing the amount of cycle stealing with a smaller pulse width between either the first pulse width and the second pulse width;
in response to the amount of cycle stealing being greater than the smaller pulse width, determining a difference between the smaller pulse width and the amount of cycle stealing allowed for the signal path; and
determining the second metric using the difference between the smaller pulse width and the amount of cycle stealing allowed for the signal path.

4. The computer-implemented method of claim 1 further comprising:
detecting the first type of timing violation on a first group of signal paths connected to the local clock buffer;
determining the first metric for the first group of signal paths;
detecting the second type of timing violation on a second group of signal paths connected to the local clock buffer;
determining the second metric for the second group of signal paths;
accumulating the first metric for the first group of signal paths to generate a first overall metric;
accumulating the second metric for the second group of signal paths to generate a second overall metric;
comparing the first overall metric with the second overall metric; and
wherein determining whether to retain the generation of the first clock signal or to configure the local clock buffer to generate the second clock signal is further based on a result of the comparison of the first overall metric with the second overall metric.

5. The computer-implemented method of claim 4, wherein comparing the first overall metric with the second overall metric comprises comparing the first overall metric with a weighed value of the second overall metric, the weight value of the second overall metric indicates a relative importance between the timing violation and the second timing violation.

6. The computer-implemented method of claim 1, wherein:
the first type of timing violation is an early mode violation;
the second type of timing violation is a late mode violation; and
the first pulse width is greater than the second pulse width.

7. The computer-implemented method of claim 4, wherein:
the first type of timing violation is a late mode violation;
the second type of timing violation is an early mode violation; and
the first pulse width is less than the second pulse width.

8. A system comprising:
a memory configured to store circuit design data of a circuit model, the circuit model comprising a local clock buffer; and
a processor configured to be in communication with the memory, the processor being configured to:
run a timing analysis engine on the circuit design data to detect a timing violation on a signal path connected to the local clock buffer in the circuit model, the local clock buffer being configured to generate a first clock signal having a first pulse width;
run an optimization tool to:
determine a first metric associated with a first type of timing violation;
determine a second metric associated with a second type of timing violation, the second type of timing violation being different from the first type of timing violation, and the detected timing violation is one of the first type of timing violation and the second type of timing violation;
compare the first metric with the second metric; and
based on a result of the comparison of the first metric and the second metric, determine whether to retain the generation of the first clock signal or to configure the local clock buffer to generate a second clock signal having a second pulse width different from the first pulse width.

9. The system of claim 8, wherein the first type of timing violation is an early mode violation, and the processor is configured to run the optimization tool to:
determine an early mode slack time of the signal path;
determining a pulse width difference between the first pulse width and the second pulse width;
identify a smaller value among an absolute value of the early mode slack time and an absolute value of the pulse width difference; and
determine the first metric using the identified smaller value.

10. The system of claim 8, wherein the second type of timing violation is a late mode violation, and the processor is configured to run the optimization tool to:
detect an amount of cycle stealing allowed for the signal path;
compare the amount of cycle stealing with a smaller pulse width between either the first pulse width and the second pulse width;
in response to the amount of cycle stealing being greater than the smaller pulse width, determining a difference between the smaller pulse width and the amount of cycle stealing allowed for the signal path; and
determining the second metric using the difference between the smaller pulse width and the amount of cycle stealing allowed for the signal path.

11. The system of claim 8, wherein the processor is configured to run the optimization tool to:
detect the first type of timing violation on a first group of signal paths connected to the local clock buffer;
determine the first metric for the first group of signal paths;
detect the second type of timing violation on a second group of signal paths connected to the local clock buffer;
determine the second metric for the second group of signal paths;
accumulate the first metric for the first group of signal paths to generate a first overall metric;

accumulate the second metric for the second group of signal paths to generate a second overall metric;

compare the first overall metric with the second overall metric; and wherein the determination of whether to retain the generation of the first clock signal or to configure the local clock buffer to generate the second clock signal is further based on a result of the comparison of the first overall metric with the second overall metric.

12. The system of claim 11, wherein the comparison of the first overall metric and the second overall metric comprises a comparison of the first overall metric with a weighed value of the second overall metric, the weight value of the second overall metric indicates a relative importance between the timing violation and the second timing violation.

13. The system of claim 11, wherein:
the first type of timing violation is an early mode violation;
the second type of timing violation is a late mode violation; and
the first pulse width is greater than the second pulse width.

14. The system of claim 11, wherein:
the first type of timing violation is a late mode violation;
the second type of timing violation is an early mode violation; and
the first pulse width is less than the second pulse width.

15. A computer program product for designing a circuit, the computer program product comprising a non-transitory computer readable storage medium having program instructions embodied therewith, the program instructions executable by a processing element to:
run a timing analysis engine to detect a timing violation on a signal path connected to a local clock buffer in a circuit model, the local clock buffer being configured to generate a first clock signal having a first pulse width;
run an optimization tool to:
determine a first metric associated with a first type of timing violation;
determine a second metric associated with a second type of timing violation, the second type of timing violation being different from the first type of timing violation, and the detected timing violation is one of the first type of timing violation and the second type of timing violation;
compare the first metric with the second metric; and
based on a result of the comparison of the first metric and the second metric, determine whether to retain the generation of the first clock signal or to configure the local clock buffer to generate a second clock signal having a second pulse width different from the first pulse width.

16. The computer program product of claim 15, wherein the first type of timing violation is an early mode violation, and the program instructions are executable by the processing element of the device to run the optimization tool to:
determine an early mode slack time of the signal path;
determining a pulse width difference between the first pulse width and the second pulse width;
identify a smaller value among an absolute value of the early mode slack time and an absolute value of the pulse width difference; and
determine the first metric using the identified smaller value.

17. The computer program product of claim 15, wherein the second type of timing violation is a late mode violation, and the program instructions are executable by the processing element to run the optimization tool to:
detect an amount of cycle stealing allowed for the signal path;
compare the amount of cycle stealing with a smaller pulse width between either the first pulse width and the second pulse width;
in response to the amount of cycle stealing being greater than the smaller pulse width, determining a difference between the smaller pulse width and the amount of cycle stealing allowed for the signal path; and
determining the second metric using the difference between the smaller pulse width and the amount of cycle stealing allowed for the signal path.

18. The computer program product of claim 15, wherein the program instructions are executable by the processing element to run the optimization tool to:
detect the first type of first timing violation on a first group of signal paths connected to the local clock buffer;
determine the first metric for the first group of signal paths;
detect the second type of timing violation on a second group of signal paths connected to the local clock buffer;
determine the second metric for the second group of signal paths;
accumulate the first metric for the first group of signal paths to generate a first overall metric;
accumulate the second metric for the second group of signal paths to generate a second overall metric;
compare the first overall metric with the second overall metric; and
wherein the determination of whether to retain the generation of the first clock signal or to configure the local clock buffer to generate the second clock signal is further based on a result of the comparison of the first overall metric with the second overall metric.

19. The computer-implemented method of claim 2, wherein determining the first metric using the identified smaller value comprises incrementing a count of the metric by the identified smaller value.

20. The computer-implemented method of claim 4, wherein:
the first overall metric indicates a benefit to configure the local clock buffer to generate the second clock signal having the second pulse width different from the first pulse width; and
the second overall metric indicates a benefit to retain the generation of the first clock signal.

* * * * *